United States Patent Office

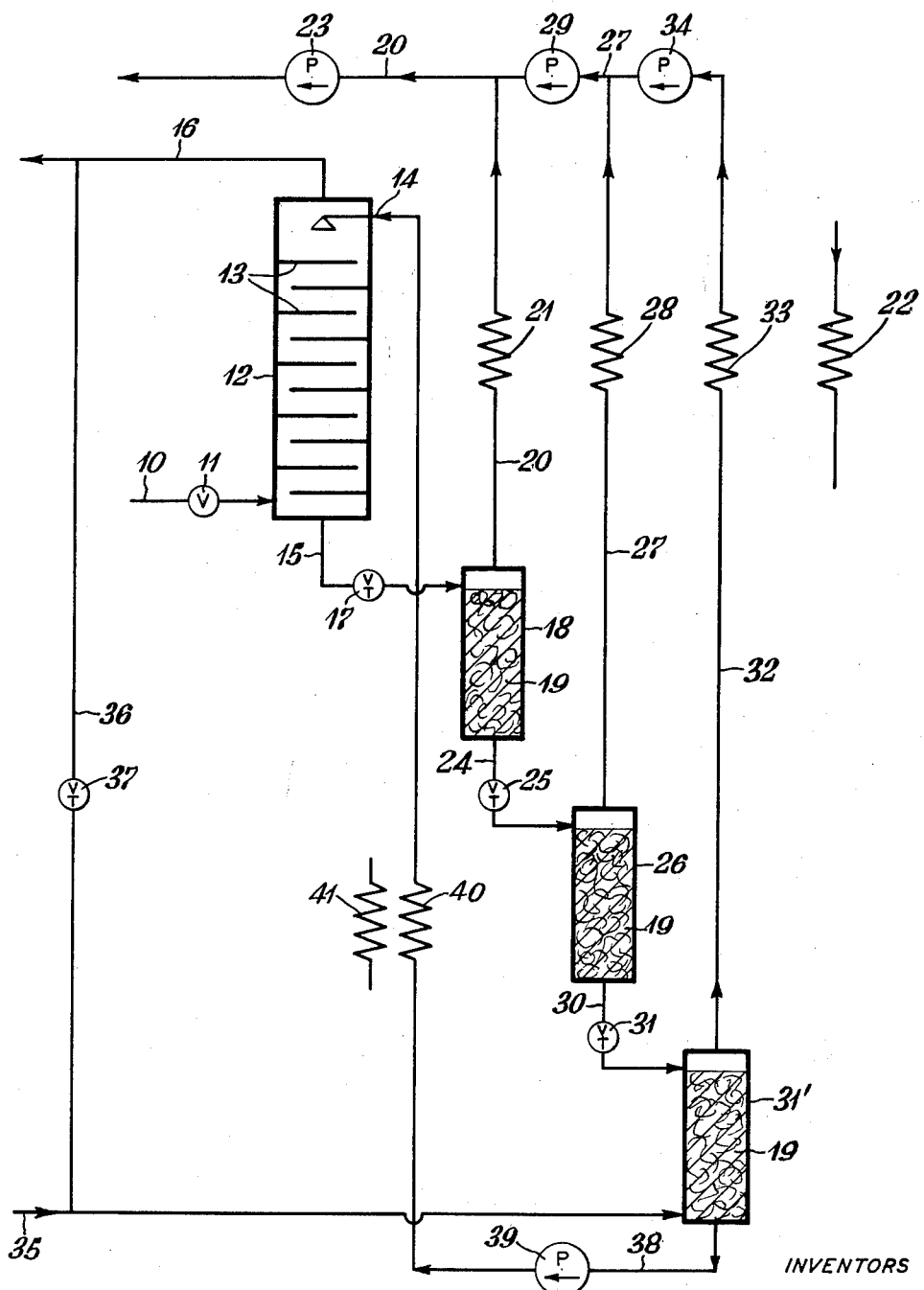

3,121,624
Patented Feb. 18, 1964

3,121,624
PROCESS AND APPARATUS FOR PURIFYING GASES BY ABSORPTION
Ladislas C. Matsch, Kenmore, and David I. J. Wang, Buffalo, N.Y., Alan M. Bekelman, Ames, Iowa, and Harry Cheung, Kenmore, N.Y., assignors to Union Carbide Corporation, a corporation of New York
Filed May 29, 1961, Ser. No. 113,458
9 Claims. (Cl. 55—44)

This invention relates to improved process and apparatus for purifying gases, and more particularly for the low-temperature separation of lower boiling impurities such as nitrogen and carbon monoxide from a crude feed gas having a major constituent boiling below about −245° C., such as hydrogen, helium or neon.

A convenient source of hydrogen in large quantities is the partial oxidation of fuels such as natural gas and oil followed by the so-called "water gas shift" process. The latter converts most of the carbon monoxide produced by the partial oxidation into carbon dioxide with the simultaneous release of additional hydrogen. The gaseous crude hydrogen obtained by such methods may contain carbon monoxide, carbon dioxide, methane, nitrogen and argon impurities which should be removed in order for the hydrogen to be suitable for most commercial purposes. For example, the efficiency of certain metallurgical processes such as direct reduction of iron ore is substantially improved if such contaminants are removed. Also, hydrogen intended for liquefaction must be of extremely high purity because substantially all impurities normally encountered will solidify in the liquefier and limit the uninterrupted operation of the equipment. It has been proposed to partially accomplish the purification of hydrogen by cooling the crude hydrogen sufficiently so that the higher boiling impurities, e.g., carbon dioxide, are condensed, and then washing the lower boiling impurity-containing hydrogen with a liquid solvent or wash such as nitrogen, methane or propane at a substantial pressure and low temperatures, e.g., −170° C., so that a portion of the lower boiling impurities are absorbed therein. The impurity-containing wash liquid is then conventionally regenerated by depressurizing to atmospheric pressure or above, heating, and stripping with air, product hydrogen or vaporized wash liquid. For example, when hydrogen is purified by washing at about −190° C. wtih a mixture of propane and propylene or propane and ethane, the previously proposed regeneration method requires that the rich wash liquid must be heated from about −190° C. to about −130° C. so that the impurities can be stripped out with reasonable economy at about 1 atmosphere. The refrigeration requirements are quite high for passing the wash liquid through this temperature range and for heat pumping the heat of solution from about −190° C. to −130° C.

Another proposed method of regenerating the wash liquid is to depressurize such liquid to about 1 atmosphere and to strip without warming. This avoids the heating and cooling steps but requires a prohibitively large portion of the product hydrogen or other cold, clean gas for stripping purposes.

Finally, some wash liquids can be regenerated simply by depressurizing to 1 atmosphere with stripping or warming as in the case of scrubbing carbon dioxide out of a gas with water. However, this method has been successful only when the water washing is performed at very high pressures. This simple depressurization scheme can be improved by depressurizing to less than 1 atmosphere absolute, but this requires that all the impurities must be recompressed to 1 atmosphere so that they may be discarded. The cost of recompressing the impurity stream is excessive.

A principal object of the present invention is to provide an improved system for the low-temperature separation of low-boiling impurities from a crude feed gas by a wash liquid, and regeneration of the impurity-containing wash liquid for reuse in the wash step.

A further object is to provide an improved system which does not require the relatively warm temperatures normally associated with regeneration of the impurity-containing wash liquid.

A still further object is to provide an improved system for the low-temperature separation of low-boiling impurities from a crude feed gas by a wash liquid, which does not require the relatively large quantity of stripping gas normally associated with regeneration of the impurity-containing wash liquid.

An additional object is to provide a highly efficient system for the low-temperature separation of low-boiling impurities such as nitrogen, carbon monoxide and methane from a crude hydrogen feed gas by a wash liquid, and regeneration of the impurity-containing wash liquid whereby the relatively warm temperatures and large quantity of stripping gas normally associated with such regeneration are not required.

These and other objects and advantages of this invention will be apparent from the following description and accompanying drawing in which:

The single figure is a flow diagram of an exemplary system for purifying crude low-boiling gases, according to the present invention.

This invention is predicated on the discovery that the impurity-containing wash liquid can be remarkably efficiently regenerated by a series of depressurizing steps at least one of which is below 1 atmosphere. For example, the rich wash liquid can be regenerated at about the washing temperature by depressurizing first to 0.3 atmosphere absolute pressure, then 0.1 atmosphere, and finally 0.03 atmosphere. By successively lowering the pressure in stages, the actual volume of gas to be compressed from the lowest pressure level is much less than if the rich liquid is depressurized directly to 0.03 atmosphere. Also, the wash liquid does not require warming and only a relatively small quantity of stripping gas is needed if at all.

More specifically, according to one embodiment, a process is provided for the low-temperature separation of low-boiling impurities from a crude feed gas having a main constituent boiling below about −245° C. including the steps of providing a feed gas stream containing the main constituent and minor amounts of the lower boiling impurities at a substantial working pressure and a low temperature below about −150° C. A wash liquid is also provided at the same low temperature and working pressure, and contacted with the feed gas thereby transferring the low-boiling impurities to the wash liquid by absorption therein. The resulting impurity-containing wash liquid is throttled to a first lower pressure thereby evaporating part of the impurities. The resulting two-phase mixture is then separated into a first impurity gas effluent and a first partially cleaned wash liquid.

The first partially cleaned wash liquid is next further throttled to a second, sub-atmospheric, pressure thereby evaporating an addition part of the low-boiling impurities. The resulting two-phase mixture is separated into a second impurity gas effluent and a second further cleaned wash liquid. The latter is repressurized to the working pressure and recycled as the wash liquid for contacting with the cold feed stream. The first and second impurity gas effluents are repressurized to at least atmospheric pressure for removal from the system.

In a preferred embodiment, either hydrogen or helium constitutes the feed gas, and nitrogen, carbon monoxide and methane are included in the low-boiling impurities.

Furthermore, three sub-atmospheric pressure reduction steps have been found particularly advantageous for this particular purification. The invention will now be described in more detail in terms of hydrogen containing $N_2$, CO and $CH_4$ but it is equally suitable for the low-temperature separation of low-boiling impurities from other feed gases such as neon and the like.

Referring now to FIG. 1, crude hydrogen feed gas is supplied at a substantial working pressure and a low temperature below about −150° C. The inlet pressure is preferably between 15 and 30 atmospheres (225 to 450 p.s.i.), and ideally about 300 p.s.i.g. These conditions provide a favorable balance between equipment and power costs, and permit work expansion of the product gas for low-temperature refrigeration, if desired, to a lower pressure still high enough for economical handling of the product. If the product is work expanded and is not required under pressure, then lower product delivery pressures down to essentially one atmosphere would be possible.

The crude hydrogen feed gas contains nitrogen, carbon monoxide and methane impurities, and may also contain other impurities such as argon, oxygen, ethane and propane. The crude feed gas is supplied to conduit 10 at, for example about −190° C. and 300 p.s.i.g., and passed through inlet valve 11 into the base of wash column 12 for contact with downwardly flowing wash liquid, suitable liquid-vapor contact means such as trays 13 being provided. The wash liquid such as a propane-propylene mixture may be supplied at about −190° C. and 300 p.s.i.g., and is introduced through conduit 14 into the top of wash column for countercurrent contact with the rising feed gas. The wash liquid readily absorbs the previously discussed low-boiling impurities and is withdrawn from the wash column base through conduit 15, while the impurity-depleted hydrogen product gas is vented from the top of wash column 12 through conduit 16. The latter may, for example, be work expanded to a relatively low pressure and passed to the consuming means, or alternatively stored at the relatively high working pressure and withdrawn from the storage vessel when needed.

The impurity-containing wash liquid withdrawn from the base of wash column 12 through conduit 15 is depressurized by valve 17 to a first sub-atmospheric pressure such as 0.3 atmosphere, and passed into separator 18. The latter preferably contains a packing material 19 such as Raschig rings or Berlsaddles to allow sufficient time and surface area for the gases to diffuse out of the liquid. A first impurity gas effluent is vented from separator 18 through conduit 20, warmed in passageway 21 by heat exchange with a warmer fluid in thermally associated passageway 22, and recompressed to at least 1 atmosphere in pump 23.

A first partially cleaned wash liquid is discharged through the bottom of separator 18 into conduit 24, depressurized through valve 25 to a second lower sub-atmospheric pressure such as 0.1 atmosphere, thereby evaporating a further part of the low-boiling impurities. The resulting two-phase mixture is then passed through conduit 24 to separator 26 for disengagement of a second impurity gas effluent from a second further cleaned wash liquid fraction. The second impurity gas effluent is vented through conduit 27 to passageway 28 where it is warmed by the previously mentioned warmer fluid in thermally associated passageway 22. The warmed second impurity effluent is then partially compressed in pump 29 and directed to communicating conduit 20 for further compression in pump 23 along with the first impurity effluent to at least atmospheric pressure.

If the propane-propylene wash liquid is still not sufficiently freed of the low-boiling impurities, it is withdrawn from separator 26 into conduit 30 as a second further cleaned wash liquid, still further depressurized in valve 31 to a third sub-atmospheric pressure such as 0.03 atmosphere. Still additional parts of the low-boiling impurities are evaporated and disengaged from the wash liquid in separator 31′, thereby producing a third impurity gas effluent and a third still further cleaned wash liquid. The impurity gas effluent is vented through conduit 32 to passageway 33 where it is warmed by heat exchange with the warmer fluid in thermally associated passageway 22. The warmed third impurity gas effluent is partially pressurized in pump 34, passed in communicating conduit 27 for further pressurization in pump 29 along with the second impurity gas effluent, and finally pressurized to at least atmospheric pressure in pump 23 prior to venting to the atmosphere.

A final pressure of about 0.03 atmosphere is sufficiently low so that substantially all of the carbon monoxide and nitrogen will be removed from the liquid. With this final pressure, the nitrogen plus carbon monoxide content of the product hydrogen can be as little as 0.5 mol percent.

Methane, which is quite soluble in propane-propylene and which has a lower vapor pressure than carbon monoxide, may not be sufficiently removed at 0.03 atmosphere. If small amounts of methane cannot be tolerated in the product hydrogen by transfer from wash column 12, then a suitable stripping gas may be supplied through conduit 35 and fed to the bottom of third separator 31′ for removal of the remaining methane. In this event, the methane-containing stripping gas is discharged from the system along with the third effluent gas through communicating conduits 32, 27 and 20.

The preferred source of stripping fluid is the product hydrogen gas vented from wash column 12 through conduit 16 at the working pressure. A minor part of such product gas may be diverted through branch conduit 36, and throttled in valve 37 to a sub-atmospheric pressure slightly above that existing in third separator 31′. The sub-atmospheric pressure product hydrogen stripping gas is then directed through communicating conduit 35 for use in the previously described manner.

Alternatively cold, clean nitrogen from some convenient source such as an air-separation plant may be cooled and employed as a stripping gas. Although nitrogen may be one of the impurities to be removed, it is the least soluble of the impurities normally encountered and will not contaminate the wash liquid at the low-pressure conditions prevailing in the separator. As a general rule the use of wash liquids with stronger absorption properties will tend to favor the use of product hydrogen (or helium) as the stripping gas.

It has previously been pointed out that the first, second and third impurity effluent streams are preferably warmed by heat exchange with a warmer fluid in passageway 22, thereby recovering at least part of the sensible refrigeration from such streams. The warmer fluid may for example be the crude hydrogen feed stream before the latter is passed to wash column 12.

The third still further cleaned wash liquid in third separator 31′ is withdrawn through conduit 38 and repressurized in pump 39 to the working pressure of the wash column 12 prior to recycling to the top of such column for reuse in the previously described manner. A heat exchange passage 40, cooled by a source of refrigeration in associated passage 41, may be provided in a conduit 14 to balance heat leak and pump inefficiency.

The invention is illustrated by the following example in which crude hydrogen gas is washed with a propane-propylene mixture followed by three stages of vacuum degasification. The crude hydrogen feed gas comprises 100 mols of the following composition:

*Table I*

| | Mol Percent |
|---|---|
| Hydrogen | 96.16 |
| Nitrogen | 0.054 |
| Carbon monoxide | 2.34 |
| Argon | 0.47 |
| Methane | 0.98 |

This feed gas is washed at −191.7° C. and 20 atmospheres pressure with the following wash liquid:

*Table II*

|  | Mols |
|---|---|
| Propane | 83.3 |
| Propylene | 83.3 |
| Carbon monoxide | 0.4 |
| Argon | 0.1 |
| Methane | 2.7 |
| Total | 169.8 [1] |

[1] Mols per 100 mols of crude hydrogen.

The wash column has 10 theoretical trays and the product hydrogen has approximately the following composition:

*Table III*

|  | Mol Percent |
|---|---|
| Hydrogen | 99.36 |
| Nitrogen | .03 |
| Carbon monoxide | .50 |
| Argon | .10 |
| Methane | .01 |

The impurity rich wash liquid is depressurized to 0.3 atmosphere and passed into a first packed separator which allows 0.45 mol of impurity to evaporate. All of the depressurization steps are effected at about −191.7° C. The gaseous impurity is warmed to ambient temperature and pumped to ambient pressure. The first partially cleaned wash liquid is then further depressurized to 0.1 atmosphere and passed into a second packed separator where 1.31 mols of impurities are evolved. A final depressurization to 0.03 atmosphere removed additional impurity. At this vacuum, sufficient carbon monoxide can be removed from the wash liquid to allow it to wash the hydrogen to the desired purity. A hydrogen product purge of 1.63 mols through the third packed separator is required to remove the methane taken up in the wash column.

The vacuum pump 34 with the lowest suction pressure, about 0.03 atmosphere, processes 3.07 mols of gas or about 39,600 cu. ft. per 100 mols of crude hydrogen through a compression ratio of 3.3. The intermediate and high pressure vacuum pumps may handle the gas from the lower pressure pumps as illustrated in FIG. 1. Table IV shows the amount of gas handled by each pump, the compression ratio, and theoretical adiabatic vacuum pump horsepower. Also shown is the effect of depressurizing the liquid directly to the stripping column at 0.03 atmosphere.

*Table IV*

|  | Mols of Gas to Pump | Actual Cu. Ft. of Gas at Suction | Compression Ratio | Horsepower of Pump at 100 Mols per Hr. of Crude Hydrogen |
|---|---|---|---|---|
| Lowest pressure vacuum pump | 3.07 | 39,600 | 3.3 | 1.80 |
| Middle pressure vacuum pump | 4.38 | 16,900 | 3.0 | 2.35 |
| Highest pressure vacuum pump | 4.83 | 6,240 | 3.3 | 2.84 |
| Total for 3 vacuum pumps | 4.83 | | | 6.99 |
| Single stage depressurization | 4.83 | 62,300 | 33 | 12.1 |

Since the cost of vacuum pumps depends greatly on the horsepower required, it will be apparent from an inspection of Table IV that stagewise depressurization represents a considerable savings in investment and power. The heat exchangers required for staged depressurization are smaller than would be required for a single step depressurization system.

It has also been found advantageous to arrange the consecutive depressurization stages in substantially equal compression ratios thereby minimizing the overall power costs. This feature is illustrated in Table IV where the three compression ratios are 3.3, 3.0 and 3.3 respectively. If one pump has an appreciably higher compression ratio than the other pumps, the required horsepower for that particular pump is increased more than the reduction in horsepower needed for the other pumps.

Staged vacuum regeneration of an impurity-containing wash liquid has been found particularly advantageous for removing the less soluble gases such as nitrogen and carbon monoxide from the wash liquid. This is because a heat pump is unnecessary between the washing and regeneration temperatures as is usually required in wash purifications at low temperatures.

Although the preferred wash liquid is a propane-propylene mixture, single wash compounds such as chlorotrifluoromethane, tetrafluoromethane, bromotrifluoromethane, dichlorodifluoromethane and monochlorodifluoromethane are suitable for practicing this invention.

Although the preferred embodiments have been described in detail, it is contemplated that modifications of the process may be made and that some features may be employed without others, all within the spirit and scope of the invention as set forth herein. For example, the pressure of each vacuum stage and the number of stages should be determined by an evaluation of the power consumed and of the investment for vacuum pumps, heat exchangers, and separators. Generally three stages are preferred, although more or less stages are also contemplated by this invention. The lowest pressure required depends on the solubility of each impurity in the wash liquid, the amount of stripping gas, if any, and the desired product gas purity.

Although stripping of the wash liquid has been described and illustrated as being performed after the staged vacuum depressurization, the stripping may alternatively be effected before depressurization to low sub-atmospheric pressures. This would be advantageous where a large quantity of stripping fluid such as nitrogen is available at the wash temperature. To remove the methane in the example given, about 0.5 mol of nitrogen is required per mol of product hydrogen if the methane stripper is at 1.3 atmosphere. Preliminary stripping has the advantage of reducing the amount of gas to be compressed by the lowest pressure vacuum pump.

Since raising the temperature decreases the solubility of gases in the wash liquid, it will occasionally be economically advantageous to warm the impurity-containing wash liquid about 30° C. in conjunction with the degasification steps. This reduces the required vacuum and/or purge gas quantity or allows more complete regeneration of the wash liquid.

As a further alternative, either of the vacuum pumps 29 and 34 may discharge directly to atmospheric pressure instead of to the suction of series-connected vacuum pumps.

What is claimed is:

1. A process for the low-temperature separation of low boiling impurities from a crude feed gas having a main constituent boiling below about −245° C. including the steps of providing a feed stream including said main constituent and containing minor amounts of said low boiling impurities at a substantial working pressure and a low temperature below about −150° C.; providing a wash liquid at about said low temperature and said working pressure; contacting the cold feed stream with said wash liquid thereby transferring said low boiling impurities to the wash liquid by absorption therein; throttling the resulting impurity-containing wash liquid to a first subatmospheric pressure thereby evaporating part of said low boiling impurities; separating the resulting two-phase mixture into a first impurity gas effluent and a first partially cleaned wash liquid; further throttling said first partially cleaned wash liquid to a second sub-atmospheric pressure thereby evaporating an additional part of said low boiling impurities; separating the resulting two-phase mixture into a second impurity gas effluent and a second further cleaned wash liquid; repressurizing said second further cleaned wash liquid to said working pressure and recycling such liquid as said wash liquid for contacting with said cold feed stream; repressurizing said second impurity gas effluent to said first sub-atmospheric pressure; and further repressurizing said first and second impurity gas effluents to at least atmospheric pressure.

2. A process for the low-temperature separation of nitrogen, carbon monoxide and methane low-boiling impurities from a crude feed gas having a main constituent boiling below about −245° C. including the steps of providing a feed stream including said main constituent and containing minor amounts of said lower boiling impurities at a substantial working pressure and a low temperature below about −150° C.; providing a wash liquid at about said low temperature and said working pressure; contacting the cold feed stream with said wash liquid thereby transferring said low boiling impurities to the wash liquid by absorption therein; throttling the resulting impurity-containing wash liquid to a first sub-atmospheric pressure thereby evaporating part of said low boiling impurities; separating the resulting two-phase mixture into a first impurity gas effluent and a first partially cleaned wash liquid; further throttling said first partially cleaned wash liquid to a second sub-atmospheric pressure thereby evaporating an additional part of said low boiling impurities; separating the resulting two-phase mixture into a second impurity gas effluent and a second further cleaned wash liquid; still further throttling said second further cleaned wash liquid to a third sub-atmospheric pressure thereby evaporating a still additional part of said low-boiling impurities; separating the resulting two-phase mixture into a third impurity gas effluent and a third still further cleaned wash liquid; repressurizing said third still further cleaned wash liquid to said working pressure and recycling such liquid as said wash liquid for contacting with said cold feed stream; repressurizing said third impurity gas effluent to said second sub-atmospheric pressure; mixing said second and third impurity gas effluents at said second sub-atmospheric pressure and further repressurizing the mixture to said first sub-atmospheric pressure; joining said mixture with said first impurity gas effluent at said first sub-atmospheric pressure; and still further repressurizing the mixture of said first, second and third impurity gas effluents to at least atmospheric pressure.

3. A process according to claim 1 in which a purge gas stream is supplied and contacted with said resulting two-phase mixture during the separation into said second impurity gas effluent and said second further cleaned wash liquid, thereby stripping any remaining impurities from such wash liquid.

4. A process according to claim 2 in which an impurity depleted product gas is recovered from said contacting with the wash liquid, and a minor part of such product gas is diverted, throttled to a low pressure and contacted with said resulting two-phase mixture during the separation into said third impurity gas effluent and said third still further cleaned wash liquid, thereby stripping any remaining methane from such wash liquid.

5. A process according to claim 2 in which said crude feed gas is hydrogen, said first sub-atmospheric pressure is about 0.3 atmosphere, said second sub-atmospheric pressure is about 0.1 atmosphere, and said third sub-atmospheric pressure is about 0.03 atmosphere.

6. A process according to claim 2 in which said crude feed gas is hydrogen, said working pressure is about 20 atmospheres, said low temperature is about −190° C., said wash liquid is a propane-propylene mixture, and said first, second and third sub-atmospheric pressures are 0.3, 0.1 and 0.03 atmosphere, respectively.

7. Apparatus for the low-temperature separation of low boiling impurities from a crude feed gas having a main constituent boiling below about −245° C. including means for providing a feed gas stream including said main constituent and containing minor amounts of said lower boiling impurities at a substantial working pressure and a low temperature below about −150° C.; means for providing a wash liquid at about said low temperature and said working pressure; means for contacting the cold feed stream with said wash liquid thereby transferring said low boiling impurities to the wash liquid by absorption therein; means for throttling the resulting impurity-containing wash liquid to a first sub-atmospheric pressure thereby evaporating part of said low-boiling impurities; means for separating the resulting two-phase mixture into a first impurity gas effluent and a first partially cleaned wash liquid; means for further throttling said first partially cleaned wash liquid to a second sub-atmospheric pressure thereby evaporating an additional part of said low-boiling impurities; means for separating the resulting two-phase mixture into a second impurity gas effluent and a second further cleaned wash liquid; means for still further throttling said second further cleaned wash liquid to a third sub-atmospheric pressure thereby evaporating a still additional part of said low boiling impurities; means for separating the resulting two-phase mixture into a third impurity gas effluent and a third still further cleaned wash liquid; means for supplying a purge gas stream to the third impurity gas effluent-third still further cleaned wash liquid separation means for stripping remaining impurity from such wash liquid; means for repressurizing said third still further cleaned wash liquid to said working pressure; means for recycling such repressurized liquid as said wash liquid for contacting with said cold feed stream; means for repressurizing said third impurity gas effluent to said second sub-atmospheric pressure; means for further repressurizing said second and third impurity gas effluents from said second sub-atmospheric pressure to said first sub-atmospheric pressure; and means for repressurizing said first, second and third impurity gas effluents from said first sub-atmospheric pressure to at least atmospheric pressure.

8. Apparatus according to claim 7 in which columns containing solid packing material constitute said means for separating the two phase mixtures.

9. Apparatus according to claim 7 including means for venting an impurity-depleted product gas effluent from the feed stream wash liquid contact means; means for diverting and throttling a minor part of such product gas effluent to a low pressure; and means for passing the throttled minor part of said product gas effluent to the purge gas supply means.

References Cited in the file of this patent

UNITED STATES PATENTS

| | | |
|---|---|---|
| 1,836,659 | Gordon | Dec. 15, 1931 |
| 2,791,290 | Natta | May 7, 1957 |
| 3,001,373 | Du Bois Eastman et al. | Sept. 26, 1961 |
| 3,026,682 | Palazzo et al. | Mar. 27, 1962 |
| 3,073,093 | Baker et al. | Jan. 15, 1963 |